(12) United States Patent
Stogel

(10) Patent No.: US 11,430,305 B2
(45) Date of Patent: *Aug. 30, 2022

(54) NOTIFICATION TERMINAL WITH TEXT-TO-SPEECH AMPLIFIER

(71) Applicant: TEXTSPEAK Corporation, Westport, CT (US)

(72) Inventor: Scott Stogel, Westport, CT (US)

(73) Assignee: TEXTSPEAK CORPORATION, Westport, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/945,426

(22) Filed: Jul. 31, 2020

(65) Prior Publication Data

US 2020/0364990 A1 Nov. 19, 2020

Related U.S. Application Data

(63) Continuation-in-part of application No. 16/396,577, filed on Apr. 26, 2019, now abandoned, which is a
(Continued)

(51) Int. Cl.
*G08B 3/10* (2006.01)
*H04W 4/14* (2009.01)
(Continued)

(52) U.S. Cl.
CPC ............ *G08B 3/10* (2013.01); *G06F 40/205* (2020.01); *G08B 25/14* (2013.01); *G08B 27/00* (2013.01);
(Continued)

(58) Field of Classification Search
CPC .......... G08B 3/10; G08B 27/00; G08B 25/14; G08B 27/005; G08B 27/006; G08B 25/08;
(Continued)

(56) References Cited

U.S. PATENT DOCUMENTS

| 6,112,323 A | 8/2000 | Meizlik et al. |
| 2003/0069002 A1 | 4/2003 | Hunter et al. |

(Continued)

FOREIGN PATENT DOCUMENTS

JP 3175497 B2 6/2001

OTHER PUBLICATIONS

6LoWPAN. Retrieved Nov. 4, 2016, from https://en.wikipedia.org/wiki/6LoWPAN.
(Continued)

*Primary Examiner* — Brian Wilson
(74) *Attorney, Agent, or Firm* — Ungerman IP PLLC; Marke Ungerman

(57) ABSTRACT

A mass notification terminal may have a data parser and decoder connected to a communications terminal. Announcements may be transmitted to the communications terminal in the form of linguistic symbols and commands using low bandwidth and low power protocol transmissions. Push transmissions conserve bandwidth. An abstraction of an audio announcement may be transmitted for use with a speech synthesizer. The abstraction may be linguistic symbols such as phonemes, text, or may identify pre-stored clips. The system may provide announcement confirmation. The system may take advantage of communication protocols that have message size limitations. The announcements may be sent in one or more message transmissions. When an announcement is composed of multiple messages, using message sequence numbers and announcement identifications may facilitate grouping and arranging of the messages that make up the announcement.

16 Claims, 7 Drawing Sheets

Related U.S. Application Data continuation of application No. 15/357,947, filed on Nov. 21, 2016, now Pat. No. 10,297,117.

(51) Int. Cl.
  *G10L 13/04* (2013.01)
  *G08B 25/14* (2006.01)
  *G06F 40/205* (2020.01)
  *G08B 27/00* (2006.01)

(52) U.S. Cl.
  CPC .............. *G10L 13/04* (2013.01); *H04W 4/14* (2013.01); *G08B 27/005* (2013.01); *G08B 27/006* (2013.01); *Y02D 30/70* (2020.08)

(58) Field of Classification Search
  CPC ..... G08B 1/08; G06F 17/2705; G06F 40/205; G06F 40/221; H04W 4/14; H04W 4/12; G10L 13/04; G10L 13/00; Y02D 70/162; Y02D 30/70; Y02D 70/142; Y02D 70/20; Y02D 70/1264; Y02D 70/23; Y02D 70/1262; Y02D 70/164; Y02D 70/21; Y02D 70/22; Y02D 70/144; Y02D 70/00
  See application file for complete search history.

(56) References Cited

U.S. PATENT DOCUMENTS

| | | | |
|---|---|---|---|
| 2005/0086685 A1 | 4/2005 | Rahman et al. | |
| 2006/0226977 A1 | 10/2006 | DeLozier et al. | |
| 2007/0066366 A1 | 3/2007 | Graham | |
| 2009/0203993 A1 | 8/2009 | Mangat et al. | |
| 2009/0303993 A1* | 12/2009 | Hochendoner | H04W 76/50 370/389 |
| 2013/0088434 A1 | 4/2013 | Masuda et al. | |
| 2014/0126278 A1 | 5/2014 | Nii et al. | |
| 2014/0126728 A1 | 5/2014 | Schaar et al. | |
| 2014/0282704 A1 | 9/2014 | Tumuluru et al. | |
| 2014/0315511 A1* | 10/2014 | Cha | H04W 4/06 455/552.1 |
| 2014/0337447 A1* | 11/2014 | Payne | H04L 67/26 709/206 |
| 2014/0354442 A1 | 12/2014 | Maity et al. | |
| 2016/0057505 A1* | 2/2016 | Gavade | H04N 21/42684 725/33 |
| 2016/0155300 A1 | 6/2016 | Mound | |
| 2017/0032402 A1* | 2/2017 | Patsiokas | G06Q 30/0207 |
| 2017/0284690 A1* | 10/2017 | Lipanov | H04Q 9/00 |
| 2018/0062777 A1 | 3/2018 | Yamane et al. | |

OTHER PUBLICATIONS

Bluetooth low energy. Retrieved Nov. 4, 2016, from https://en.wikipedia.org/wiki/Bluetooth_low_energy.
Cell Broadcast. Retrieved Sep. 30, 2016, from https://en.wikipedia.org/wiki/Cell_Broadcast.
Cellular network. Retrieved Sep. 30, 2016, from https://en.wikipedia.org/wiki/Cellular_network.
Digi International. Retrieved Nov. 4, 2016, from https7/en.wikipedia.org/wiki/Digi_International#DigiMesh.
Emergency communication system. Retrieved Sep. 30, 2016, from https://en.wikipedia.org/wiki/Emergency_communication_system.
Emergency notification system. Retrieved Sep. 30, 2016, from https://en.wikipedia.org/wiki/Emergency_notification_system.
Internet of things. Retrieved Sep. 30, 2016, from https://en.wikipedia.org/wiki/Internet_of_things.
LPWAN. Retrieved Sep. 30, 2016, from https://en.wikipedia.org/wiki/LPWAN.
Machine to machine. Retrieved Sep. 30, 2016, from https://en.wikipedia.org/wiki/Machine_to_machine.
Mass_call_event. Retrieved Sep. 30, 2016, from https://en.wikipedia.org/wiki/Mass_call_event.
Reportlinker. Low-Power Wide Area Network Connectivity Optimised for Internet of Things. R. (Jan. 19, 2016). Retrieved Aug. 10, 2016, from http://www.prnewswire.com/news-releases/low-power-wide-area-network-connectivity-optimised-for-internet-of-things-300206589.html.
Short Message Service. Retrieved Sep. 30, 2016, from https://en.wikipedia.org/wiki/Short_Message_Service.
ZigBee. Retrieved Nov. 4, 2016, from https://en.wikipedia.org/wiki/ZigBee.

* cited by examiner

NOTIFICATION TERMINAL WITH TEXT-TO-SPEECH AMPLIFIER

CROSS REFERENCE TO RELATED APPLICATIONS

This application is a continuation-in-part of and claims priority to U.S. application Ser. No. 16/396,577 filed Apr. 26, 2019 which is a continuation of and claims priority to U.S. application Ser. No. 15/357,947 filed Nov. 21, 2016. U.S. application Ser. No. 16/373,481, now U.S. Pat. No. 10,535,234, is a divisional of application Ser. No. 15/357,947 filed Nov. 21, 2016, now U.S. Pat. No. 10,297,117.

BACKGROUND OF THE INVENTION

1. Field of the Invention

The invention relates to notification apparatus and methods, and more particularly to notification systems with a speech synthesizer.

2. Description of the Related Technology

An emergency notification system may facilitate dissemination or broadcast of messages to one or many points, alerting them to a pending or existing emergency or providing other information.

One-click notification is a method of clicking one button within a mobile app or emergency notification platform to initiate the dissemination of a message. An emergency notification system such as Red Messaging is an example of one-click notification. Organizations may use a one-click notification service to trigger the sending of messages via pre-saved configurations such as selected contact groups, chosen delivery methods, etc.

Emergencies place demands on communication processes that are often significantly different from the demands of non-emergency circumstances. Emergencies often involve escalating and evolving events that demand high performance and flexibility from the systems that provide emergency communication services. Message prioritization, automation of communication, fast message delivery, communication audit trails, and other capabilities are often required by each unique emergency situation. Inadequate emergency communications capabilities can have consequences that are inconvenient at best and disastrous at worst. There are many examples of emergency notification deficiencies.

During the September 11 attack in 2001, traditional telecommunications were stretched and overloaded. Phone networks along the entire East Coast were congested into uselessness. 911 operators were overwhelmed with calls and could do little more than offer encouragement because of the confusing information they were receiving. Communications between emergency services personnel were limited by a lack of interoperability between departments. Many firefighters died when the towers collapsed because they couldn't receive the warning that the police officers received from the New York City Police Department (NYPD) helicopters. Amateur radio played a large role in facilitating communications between the various emergency departments, which operated on different frequencies and protocols.

On the day of the 7 Jul. 2005 London bombings, mobile phone networks, including Vodafone, reached full capacity and were overloaded by 10:00 a.m., only an hour and ten minutes after the bombs went off. Because of an antiquated radio system, the damaged trains were unable to communicate with the Transport for London control center or emergency personnel, while senior emergency services managers, of the London Ambulance Service in particular, were forced to rely on the already overloaded mobile phone network because of the lack of digital radios. The Access Overload Control, implemented only in a 1 km area around Aldgate Tube Station, wasn't helpful because many officials didn't have ACCOLC-enabled mobile phones.

161 people were killed and at least 990 injured when an EF5 multiple-vortex tornado hit Joplin, Mo. Because Joplin is located in a tornado-heavy area of the country, many people considered the tornado sirens routine and ignored them. Instead, many residents waited until they received confirmation from another, non-routine, source, such as seeing the tornado, a radio or TV report, or hearing a second siren. In the aftermath, an assessment team recommended that emergency warnings take risk perception into account to convey a sense of urgency.

When Hurricane Katrina, a Category 5 hurricane, hit New Orleans, the emergency communications systems were completely destroyed, including power stations, internet servers, mobile phone towers, and 911 services. The Federal relief workers' satellite phones weren't interoperable, even when they did work. A few AM radio stations were able to continue broadcasting throughout the storm, notably WWL Radio, which remained on the air by broadcasting from a closet. Amateur radio was instrumental in the rescue process and maintained signals when 911 communications were damaged or overloaded. In this case it was reported that voice and internet data channels were inoperative, while low overhead SMS traffic on cellular channels were operational.

The Virginia Tech Massacre, which resulted in the death of 33 people, helped propel discourse for effective emergency communication systems in schools. Virginia Tech had systems already in place, including e-mail and text notifications, but lacked a cohesive plan for using them. No warnings were sent out until after the event, two and a half hours after the initial shootings. Virginia Tech has since updated its emergency communications systems, especially public ones, since students can't always check e-mail in a timely fashion and professors often request that wireless devices be turned off in class. Because the massacre occurred within a 10-minute period, improved emergency communications systems with an emphasis on speed of communication are required.

The Japan Meteorological Agency's (JMA) early warning system, which uses seismometers, was able to alert millions of people across Japan about the impending earthquake via radio, mobile phone networks, including Docomo, AU, and SoftBank, and television, including both NHK channels and cable channels. The tsunami warning system alerted people shortly after, although the tsunami was larger than expected. In areas with infrastructure still intact, even though both landline and mobile phone lines were not functioning as might be expected, the Internet was still accessible. In the hardest hit areas, particularly Sendai and other areas of Miyagi, Iwate, and Fukushima Prefectures, satellite phones were often the only form of communication that functioned reliably. The following nuclear disaster at the Fukushima Daiichi Plant was rife with communications problems. No communications plan was in place, internal communications were poor, external communications were slow, and the public quickly lost confidence in TEPCO and the nuclear industry.

During the 2012 Aurora shooting on Jul. 20, 2012, the gunman, James Eagan Holmes, released tear gas before opening fire during a showing of The Dark Knight Rises, causing many of the moviegoers to mistake the attack for part of the film's special effects. According to preliminary reports, the suspect initially went into the theater as a patron. He then exited and propped open an emergency exit, while he went to his car to get his bulletproof vest and weapons. He then attacked after reentry through the propped-open door. In this type of situation, there was no effective warning. Shortly after the assailant began shooting, the building's fire alarms were sounded. The natural inclination, in response to a fire alarm, would be to evacuate the building, but in this case, the assailant was specifically targeting people who attempted to exit.

Hurricane Sandy hit New York City, New Jersey, and the surrounding area on Oct. 29, 2012, destroying thousands of houses and leaving millions without electricity and thus without internet, mobile phones, or landline communications. To prepare for the hurricane, many areas provided additional emergency help lines in case 911 wasn't available, The Federal Emergency Management Agency has strengthened its ability to respond to a disaster since the communications problems during Hurricane Katrina and using Twitter in its rescue efforts, and amateur radio operators were on standby to provide emergency communications. In the aftermath, up to 25% of mobile phone towers, network providers, and television stations were powerless.

An emergency involves unforeseen combination of circumstances or the resulting state that calls for immediate action. As such, it should be considered critically important that any communication about an emergency be timely and quick to disseminate, in order to mitigate damage or loss of life. For example, during the Virginia Tech massacre, about two hours had passed before the first communication (an email) was sent to staff and students; and by that time, the gunman had already entered and secured a building in which he was shortly to begin his attack. In that case, it wasn't until about 20 minutes after the shootings began, that a loudspeaker announcement was made for people to take cover. In many cases, it's likely obvious that mere seconds and minutes are absolutely critical. There is a clear need for improvements to emergency notification/communication systems.

During a crisis, the people who use an emergency communication system need to quickly and easily launch their notifications and they need to be able to do so in a way that securely provides them with confidence and an intuitive, familiar and easy-to-use interface that can be accessed from any location. Messages, both in audio and visual form need to be deliberate, to the point, and be clearly understood. An emergency communication system that's designed for non-technical users will facilitate enhanced results in administration and usage; and during some life-threatening emergency situations, campus administrators must be able to react quickly and trigger the alert system swiftly. Yet emergency alert is probably among the least used and least familiar processes. Ease-of-use therefore is critical to the effectiveness of an emergency communication system.

However, in order to support a robust and capable emergency communication ability, this ease of use should not preclude the utilization of a complex, technologically advanced system. A sufficiently advanced system is required to coordinate multiple components to act in concert, to initiate and propagate emergency communications in any manner of ways. A distinguishing factor is in such a system bearing these advanced capabilities, while still being easy for the user to operate for both emergency and everyday communications (so users can feel comfortable with it)—not only for effective emergency communication, but also for an organization to realize the most return on investment, as well as the user being familiar enough with its operation as to effectively operate it under stressful emergency situations, such as in earthquake, tsunami, etc.

Overall, the more affordable the cost of procuring, installing, and maintaining an emergency communication system is, the more prolific such systems may become; and the more prolific these systems are, the more likely it is that these systems will be available to aid in times of emergency in more locations. Beyond supporting emergency response, mass notification systems may be a valuable asset for everyday, non-emergency, intra- and inter-plant communications. The deployment of interoperable, multi-device communications technology that enhances overall plant communications, and provides a host of useful software-based management and administrative tools is desirable.

An attribute of any modern emergency communication system is the ability to provide notification of an emergency and to provide clear and actionable instructions for how to respond to an emergency.

Emergencies often require delivery of different versions of the same communication at the same time. For example, in an armed hostage-taking incident, occupants of a building may need to receive instructions to lock and barricade the door until further notice, while first responders to the incident need to be aware of the lockdown instructions and be provided more specific details of the hostage-taking event to inform their actions.

It has been recognized that multiple means of delivering emergency information is desirable.

Conventional communication tools such as smartphones, flat-panel digital signage, GPS, and text-to-speech (among many others) are being used for emergency notification. There are drawbacks to current implementations of all of these tools.

There are primarily two major types of communication devices: those for individual people and those for groups of people. Public Communication Devices are the devices that are designed to deliver a communication to more than one person as a single process at the same time. Examples include a digital electronic sign, a loudspeaker that is part of a PA system, or a large flat panel display on a wall. A private communication device is a device that is designed to deliver communication to one person at a time through a single process. Typically, a single person is in control of such a device which is usually not shared. Examples include a cell phone, a text message on the cell phone, an email, or a message over a 2-way radio.

Public communication refers to the conveyance of messages to people, in such a way that anyone may receive the communication at nearly the same time as anyone else, typically using a common device. The most common way of facilitating public communications is by using devices that are incorporated into some public venue, such as public-address systems or digital signage. Using public devices for the purpose of public warning empowers people at risk to take actions to reduce losses from natural hazards, accidents, and acts of terrorism.

Private means the delivery of messages to a specific individual, in a private manner or in a way that even those nearby may not get the message. Common ways of facilitating private communications involve devices such as telephones or electronic mail.

Mobile phones may be considered a private communication device because they are usually associated with or owned by a single individual. One possible limitation of using mobile phones for emergency communications, in a bomb-threat situation, for example, might include the potential of cellular networks being disabled for fear that a bomb might be detonated using a cellular phone.

SMS text messages are a type of private communication because they are directed toward a specific mobile number; and, thus, they are designed to reach one person at a time without the general public knowing anything about the message. A limitation in using SMS messaging for emergencies is that it may not meet the needs of emergency communication: this is, it must be highly reliable, be secure, have excellent access control, and high-speed delivery. Additionally, to be effective a cellular phone must be registered in advance to receive standard SMS messages, and can only receive Government generated Cellular Broadcasts (CB) from the WEA notification system.

Machine to machine (also identified as machine-to-machine or M2M) refers to direct communication between devices using any communications channel, including wired and wireless. Machine to machine communication may be implemented by a system of networks that transmit data to personal appliances. The expansion of IP networks around the world has made machine to machine communication quicker and easier while using less power.

Cloud connectivity is becoming a significant piece of the machine to machine solution as cellular and wireless communication speeds increase. Machine to machine solutions providers now offer networks that allow users to manage deployments remotely.

The internet of things (IoT) is the internetworking of physical devices, vehicles (also referred to as "connected devices" and "smart devices"), buildings and other items—embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems. IoT offers advanced connectivity of devices, systems, and services that goes beyond machine to machine communications and covers a variety of protocols, domains, and applications.

Low-Power Wide-Area Network (LPWAN) or Low-Power Network (LPN) is a type of wireless telecommunication network designed to allow long range communications at a low bit rate among things (connected objects), such as sensors operated on a battery.

6LoWPAN (IPv6 over Low power Wireless Personal Area Networks) is based on RFC 4944 (updated by RFC 6282 with header compression, and by RFC 6775 with neighbor discovery optimizations) developed by the 6LoWPAN IETF group. The target for 6LoWPAN is IP networking for low-power radio communication is applications that use wireless internet connectivity at lower data rates for devices with very limited form factor.

ZigBee is another communication protocol that, like 6LoWPAN is low power for use in low data rate applications. Zigbee may be used to create personal area networks with small, low-power digital radios. ZigBee has a defined rate of 250 kbit/s, suited for intermittent data transmissions from a sensor or input device. DigiMesh is another low power radio communication protocol designed for peer-to-peer wireless networking topology. The DigiMesh protocol allows for time synchronized sleeping nodes/routers and low-power battery powered operation. Bluetooth low energy (Bluetooth LE, BLE, marketed as Bluetooth Smart) is a wireless personal area network technology. BLE provides considerably reduced power consumption and cost as compared to classic Bluetooth.

Current platforms and technologies include: LoRaWAN, Long Range Wide Area Network (WAN), from the LoRa Alliance; NarrowBand IoT (NB-IOT), standardization effort by 3GPP for a LPWAN used in cellular networks that evolved from Huawei's NB-CIoT effort; LTE Advanced for Machine Type Communications (LTE-M), an evolution of LTE communications for connected things by 3GPP; NB-Fi Protocol, from WAVIoT; NWave, a proprietary technology that also forms the basis of Weightless protocols; RPMA, Random Phase Multiple Access technology from Ingenu, formerly known as On-Ramp Wireless; Senet, public LoRaWAN provider in North America; Symphony Link, LoRa-based platform from Link Labs; Sigfox, UNB-based technology and French company; ThingPark Wireless, a platform from Acility (based on LoRaWAN specification); Weightless, a set of communication standards from the Weightless SIG; LoRa, proprietary CSS modulation technology used for LPWAN patented by Semtech by LoRa Alliance used by LoRaWan and Symphony Link; and UNB, Ultra Narrow Band modulation technology used for LPWAN by various companies including Telensa, NWave, Weightless-N and Sigfox.

Short Message Service (SMS) is a text messaging service component of telephone, World Wide Web, and mobile telephony systems. It uses standardized communications protocols to enable fixed-line or mobile phone devices to exchange short text messages. SMS was the most widely used data application, with an estimated 3.5 billion active users, or about 80% of all mobile phone subscribers, at the end of 2010. SMS is also employed in mobile marketing, a type of direct marketing.

SMS as used on modern handsets originated from radio telegraphy in radio memo pagers using standardized phone protocols. These were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies, such as ANSI CDMA networks and Digital AMPS, as well as satellite and landline networks. SMS also is used as a broadcast push notification called Cellular Broadcasts (CB) for government initiated broadcast of Amber Alerts, Weather and Emergency Notification events.

TCP/IP based communications such as HTTP, UDP and FTP can also be adapted for use in small data payloads over Low Bandwidth M2M communications, both wired and wireless. Providers such as Verizon have offered services that provide extremely low yearly fees, based on limited bandwidth. To allow usage of the cost advantage, data volume must be kept low, at a level that precludes practical transmission of audio information using conventional coding protocols. For example, a conventional MP3 audio message requires a minimum bit rate of 8 kbits/sec and up to 320 kbits/sec.

Packet sizes for LPWA data may be limited and only support small intermittent blocks of data. To increase content transfer binary compression with little or no overhead may be used to improve throughput. For example, payload information, may be converted 6-bit data while still preserving text and control code content, or compression such as Shoco, under license by MIT, can be used to increase content throughput by up to 50%. In this way LPWA data can be transformed into speech with more efficiency.

SUMMARY OF THE INVENTION

According to an advantageous feature of the invention, an audio amplifier supporting alert announcements over wide area wireless channels is described that operates more effectively than existing systems. The audio amplifier may convert ASCII coded data representing time-sensitive phrases and events to audio announcements based on data representing text and/or instructions received over a low bandwidth network. The audio announcements may be delivered by a loudspeaker associated with the audio amplifier. The system may support real-time dynamic content that may be created at distant locations. The real-time input data uses low cost wireless connectivity and, when the data input is idle, the wireless network is idle, to keep costs of the wireless provider low. To accomplish this, an integrated speech synthesizer such as Text-to-Speech may operate with low data rate inputs with real time management from a mobile device, automated machinery, or a cloud-based server. Push data mode may be incorporated for further cost savings to avoid use of bandwidth attendant to polling over a network which, in operation, would be done at intervals measured in seconds. Whereas use of push data may be limited by activation only when called for. In the case of an alerting announcement, the demand for network bandwidth is tightly linked to announcements made. Depending on need, the interval may be a year or more. This is contrasted by polling systems that require frequent activation. The extended intervals result in cost-effective idle state management allowing use of a service provided in Cellular SMS, Low Power Wide Area ("LPWA") and other M2M networks. Additionally, the low data rate achieved using Text-to-Speech over wireless networks is cost effective because the cost of data communication services is typically based on accumulated bytes of data used and the bandwidth requirements for the presently described system are low enough to take advantage of very low cost low bandwidth communications. A low bandwidth transport medium may be considered to be any channel that, due to bandwidth, is unable to support data rates, latency, and/or packet size, do not permit streaming of audio with raw or even highly compressed data such as ADPCM, CELP, MP3, and others, such as those supporting VOIP Limitations inherent in low bandwidth transport media are that seconds may be involved to create a data buffer of sufficient size to collect data to decompress that will not avoid analog dropouts or [lossy] compression will result in unintelligible sound due to compression type, poor dynamic range, or audio spectrum cutoffs. This is further limited when networks are throttled in times of crisis and emergency, as mentioned in the previous historical events. The system outlined uniquely combines the advantages above in an integrated notification terminal.

A method for generating audio announcements may include the step of receiving transmission of messages that make up an announcement. The messages may include an announcement identifier, a sequence identifier, and a payload. The payload may include data representing commands and data representing linguistic symbols. The method may include the step of parsing the messages to identify the data representing linguistic symbols and the step of processing the data representing linguistic symbols through a speech synthesizer in an order prescribed per the announcement identifier and the sequence identifier. The method may include the step of monitoring an output of the speech synthesizer and issuing a confirmation upon detection that all linguistic symbols corresponding to the announcement identifier have been processed by the speech synthesizer. The linguistic symbols may be text and may be data representing phonemes. The step of issuing may include issuing the confirmation to an address association with the announcement. At least one message relating to an announcement identifier may include data representing an end of transmission indicator. The step of processing may be commenced after receipt of a message including data representing the end of the transmission indicator. The step of processing may be commenced after receipt of a message including data representing the end of transmission indicator and all messages relating an announcement identifier. The messages include data representing a time stamp. Messages relating to an announcement identifier may be discarded if a complete sequence of messages relating to the announcement identifier are not received within a time permitted for announcement of the audio announcement relating to an announcement identifier.

A mass notification terminal may include a communication terminal, a data parser and a decoder responsive to the communication terminal. A speech synthesizer connected to a linguistic output of the data parser and decoder and a sensor may be responsive to an output of the speech synthesizer and may have an output indicative of an output of the speech synthesizer. The communication terminal may be an LPWA (low power wide area) network communication terminal. The communication terminal may be a low data rate cellular terminal with an SMS (short message system) channel. The communication terminal may be a low data rate radio terminal with mesh network channels. The communications terminal may be a wired or wireless LAN with TCP/IP designed to support M2M data payloads. The mass notification terminal may include an amplifier connected to an output of the speech synthesizer and have a speaker, transducer or terminals connected to an output of the amplifier. The mass notification terminal may include a sensor connected to the data parser and decoder. The data parser and controller may further include a command parser configured to identify and connect input commands to a controller. The mass notification terminal may also include a message array connected to an output of the data parser and decoder. The mass notification terminal may also include a communication interface connected to a communication channel where the communication interface may be connected to the data parser and controller. The data parser and controller may have a trigger output.

A mass notification system may have one or more notification terminals having at least a low bandwidth communication terminal; a data parser and decoder responsive to the communication terminal; an audio file store connected to the data parser and decoder; a speech synthesizer connected to an output of the data parser and decoder; and an amplifier having a speech input connected to a speech output of the speech synthesizer and connected to a speech output of the audio file store. In addition, personal communication devices having an application program configured to dispatch linguistic symbols and control commands to a pre-established address corresponding to an address of the notification terminal may be deployed.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Before the present invention is described in further detail, it is to be understood that the invention is not limited to the embodiments described, as such may, of course, vary. It is also to be understood that the terminology used herein is for describing embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by prior invention. Further, the dates of publication provided may be different from the actual publication dates, which may need to be independently confirmed.

Figure 1:
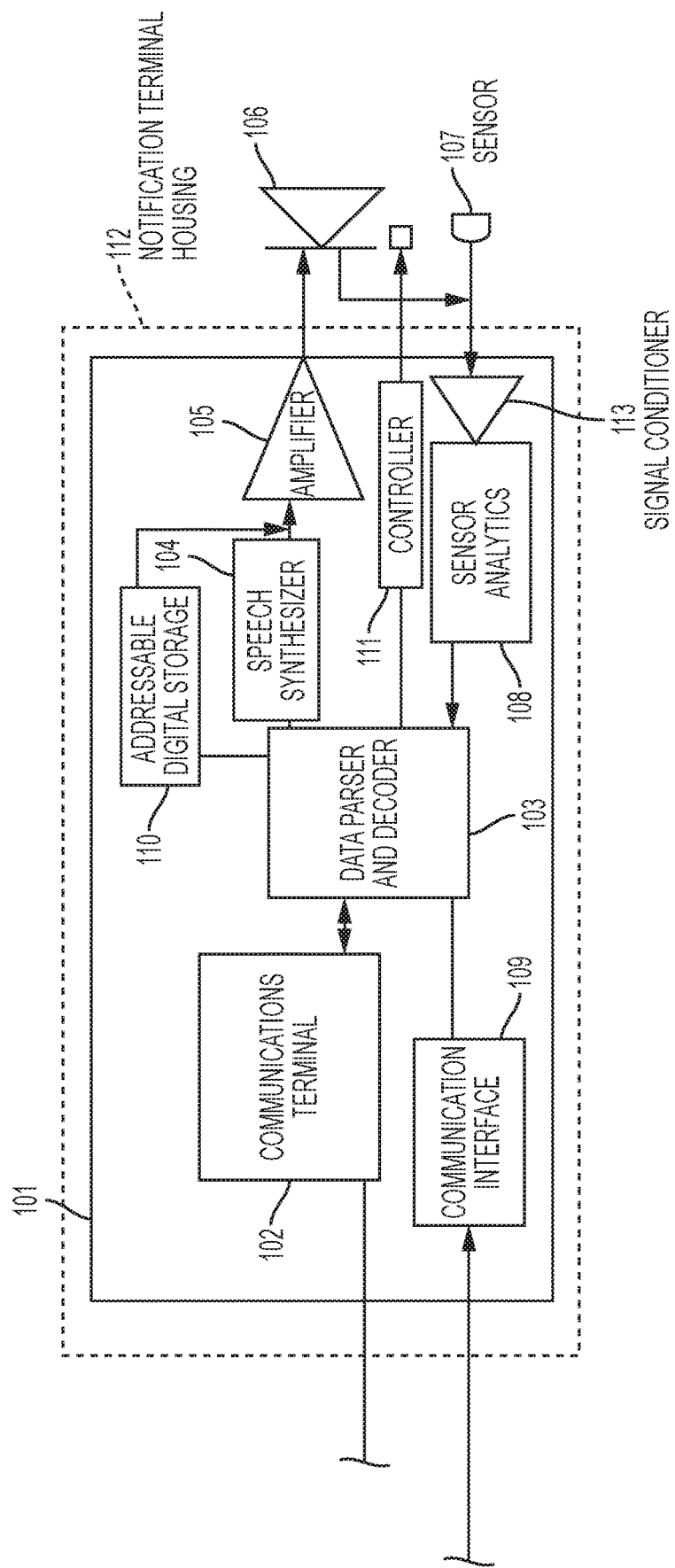
FIG. 1 shows an embodiment of a notification terminal.

FIG. 1 shows a notification terminal 101. The notification terminal 101 may have communications terminal 102. The communications terminal 102 may be a low-powered wide area (LPWA) terminal. The communications terminal 102 may be an M2M cellular terminal, a mesh network of low data rate radios supporting wireless WLAN for M2M (ex: 802.11) or a terminal using another low-cost transmission medium. The communications terminal 102 may be connected to a data parser and decoder 103. The data parser and decoder 103 may be connected to a speech synthesizer 104, for example, a text-to-speech converter. An output of the speech synthesizer 104 may be connected to amplifier 105. The amplifier 105 may drive a speaker 106. The speaker may be internal to a notification terminal housing 112 or mounted externally/remotely to the notification terminal housing 112. Similarly, a sensor 107 may be mounted on or in the notification terminal housing 112 or mounted externally to the notification terminal housing 112. Sensor 107 may be an audio sensor, or other sensor to monitor a condition of interest. The sensor 107 may be connected to a signal conditioner 113. The signal conditioner 113 may be connected to sensor analytics 108. The sensor analytics 108 may be connected to the data parser and decoder 103. A communication interface 109 may be connected to the data parser and decoder 103. Storage 110 in the form of addressable memory may be connected to the data parser and decoder 103 and the amplifier 105. The communications terminal 102 and/or the communications interface 109 may be bi-directional to facilitate transmission of an announcement confirmation. The channels 102 and 109 may be shared.

The notification terminal 101 may be utilized in many applications where there is a desire to take advantage of the lower cost associated with low power and low bandwidth communication protocols. The notification terminal 101 may be powered by a battery and/or connected to the line power source. The notification terminal 101 is suited for use as a mass notification terminal.

The communications terminal 102 may use a cellular-based machine-to-machine (M2M) or any other low power and/or low bandwidth wide area network communication terminals. Such communication terminals, may be the types of terminals used in IOT applications. The nature of such terminals admits to operation on battery power over a long term without recharging. The communications terminal 102 may be addressable and capable of receiving low bandwidth communications such as SMS messages. The communications received by the communications terminal 102 may include data representative of text information and data representative of commands.

The communications terminal 102 may receive communications and convert those to digital data. The communications terminal 102 may transmit the digital data to the data parser and decoder 103. The data parser and decoder 103 may include an authentication or validation control for security purposes. The data parser and decoder 103 may distinguish between data representing text messages and data representing command and/or control signals. Both text and command signals may be provided to the text-to-speech converter 104.

The speech synthesizer 104 may receive and interpret commands such as language, volume, repetition, and sensor data. In addition, the speech synthesizer 104 may receive data representing text and may operate to convert the data representing text signals to data representing audio information.

The signals representing audio information may be provided to an amplifier 105. The signals representing audio information may be converted from digital signals to analog signals in the speech synthesizer 104, or may be converted by digital-to-analog converters after being output from speech synthesizer 104.

The speech synthesizer 104 may include circuitry designed to scale the amplitude of an analog output signal to a standard level or to a programmable level. The programmable level may be established according to the desired volume of the notification audio.

The amplifier 105 may condition the audio information provided at its input to a desirable level for a speaker 106. The speaker 106 may receive an electrical signal representing audio information from the amplifier 105 and convert the electrical signal to an audio output.

The data parser and decoder 103 may be adapted to generate signals for use by a controller 111 or other components. In addition, the data parser and decoder 103 may be responsive to signals obtained from or derived from a sensor. For example, the sensor 107, may be a microphone. The sensor may also be a digital input. Depending on the sensor, the output of the sensor may be provided to a signal conditioner 113. For analog signals, the signal conditioner may be a voltage threshold detection system that can detect and decode the cadence and composition of impulse noise. The digital input may be a contact closure logic detector or a sensor that decodes reception of signals, such as Bluetooth BLE wireless beacons, or infrared and inductive proximity sensors. Sensor output may be provided to sensor analytics 108. The sensor analytics 108 may generate an output indicative of an interpretation of sensor signal inputs. For example, the sensor 107, signal conditioner 113, and sensor analytics 108 may be configured to generate an output signal upon detection of audio determined to be consistent with audio generated by a gunshot. The sensor analytics 108 may be connected to the data parser and decoder 103 to receive information indicative of the sensed condition. The sensor 107, signal conditioner 113, and sensor analytics 108 may be used to generate a signal indicative of a successful announcement. The sensor may include a microphone, the output of which may be monitored for information indicative of an announcement. This may be performed by timing the audio output for activity having a duration consistent with expected duration of an announcement outputting the sensed information through a speech-to-text process and comparing the output to the text of the announcement. Another confirmation process may be to generate an audio fingerprint or other abstraction from the sensor 107 output and compare to an abstraction of the announcement. The sensor 107 may be as simple as a pushbutton which may also provide coded identification information. The sensor analytics 108 may be connected to the data parser and decoder 103 in order adjust volume at amplifier 105 indicative of the sensed condition.

The following are examples of command and control inputs that may be included in a data transmission and supported by the notification terminal where the letters represent control codes and the # symbols or information surrounded by [ ] represent delimiters.

The data parser and decoder may remove the command and control codes prior to passing the data to the Text-to-Speech processor so the codes are not spoken. The codes may be ASCII characters to allow transmission over the SMS character set. The codes below are shown for clarity and may be abbreviated to limit payload overhead for some LPWA network constraints.

A—Abort current speech. Allows control to abort current speech.

V#—Volume 1-9, used to set the physical level of an external amplifier.

E##—Event codes to inform the terminal of an event to execute, such as turn on a physical flasher.

L##—Language selection code to enable phrases to change languages, voices or genders within a parsed data block.

P"cc.wav"—Wave file name, to insert audio tones or pre-recorded files.

R#—Repeat the entire phrase.

S##—Set urgency or Priority in a queue of messages

C##—Command an event such as connect to a server for update of internal software, report status or to seek further instructions X—End of message code to inform the parser the message is complete.

Z##—Message assembly code used to concatenate multi-packet messages of characters into a single spoken phrase.

M###—Message ID for message acknowledgment sent back to the sender.

The data parser may also support Encoding of codes in outbound return and confirmation of messages to deliver URC's or Unsolicited Response Connections to indicate faults or events. These can be in the form of embedded text characters, JSON, XML or other codes known to be supported by the remote server.

Another way to control internal and external components is through a control output of the data parser and controller 103. For example, an output may be provided to controller 111. The controller 111 may interpret the output of the data parser and decoder 103 and issue appropriate output signals. For example, controller 111 may be connected to amplifier 105 to control the output signal level of the amplifier 105 which in turn relates to the audio volume of the speaker output 106. The controller 111 may also include an external output. For example, the external output may provide information or control signals to external security components. The external security components may, for example, be a lockdown system to automatically lock doors or exits. Another example would be to trigger an alarm system such as a fire alarm or a visual signaling system such as a strobe designed to alert individuals with hearing impairments of a detected condition.

The data parser and decoder 103 may be configured to process the message payloads. The transmission to the notification terminal may comply with a protocol that limits message length such that multiple messages may need to be assembled to complete transmission. The data parser and decoder 103 may be configured to group incoming messages according to a message identification field. The incoming messages may not arrive in the proper order, therefore the data parser and decoder 103 may also interpret a sequence identifier contained in received messages. The data parser and decoder 103 may be configured to group messages having the same message identifier and order them according to the sequence and identifier.

The data parser and decoder 103 may be configured to store messages for a period of time when a message arrives with a new message number. A short delay permits the data parser and decoder 103 to receive all messages that are part of a single announcement and allow them to be played or processed in the correct sequence.

Instead of a message number, the data parser and controller 103 may be configured to monitor a transmitting station identifier contained in a message. The transmitting station identifier may be used to group messages that are part of the same announcement and then place the messages in the correct order based on a sequence identifier.

A communications interface 109 may be provided as an alternative means of communicating with the data parser and controller 103. The communications interface 109 may not be a low power or a wide area communications interface. For example, the communications interface may be a USB, serial, Wi-Fi, or Ethernet interface. In instances where the terminal 102 is not provided or available, communications may be assumed by 109 for backup or commercialization.

The system may include an addressable digital storage 110. The addressable digital storage 110 may be connected to the data parser and decoder 103 and the amplifier 105. The addressable digital storage 110 may include data representative of pre-established audio clips. The pre-recorded audio information may be selected by an output of the data parser and decoder 103 and provided to the amplifier 105. The purpose of the addressable digital storage 110 is to store pre-recorded messages or other audio information which may be announced by the notification terminal 101 but are not provided by text information. Such a feature may be used, for example, when an announcement is represented by a larger amount of data than could be quickly and efficiently transmitted in a text format or a tone or other sound is needed that cannot be effectively created by text-to-speech conversion. In addition, the addressable digital storage 110 may contain information representative of audio which is not easily represented by text such as an alarm signal. Information contained in the addressable digital storage 110 may be pre-stored in the component or may be provided by a connection to the communications interface 109.

Figure 2:
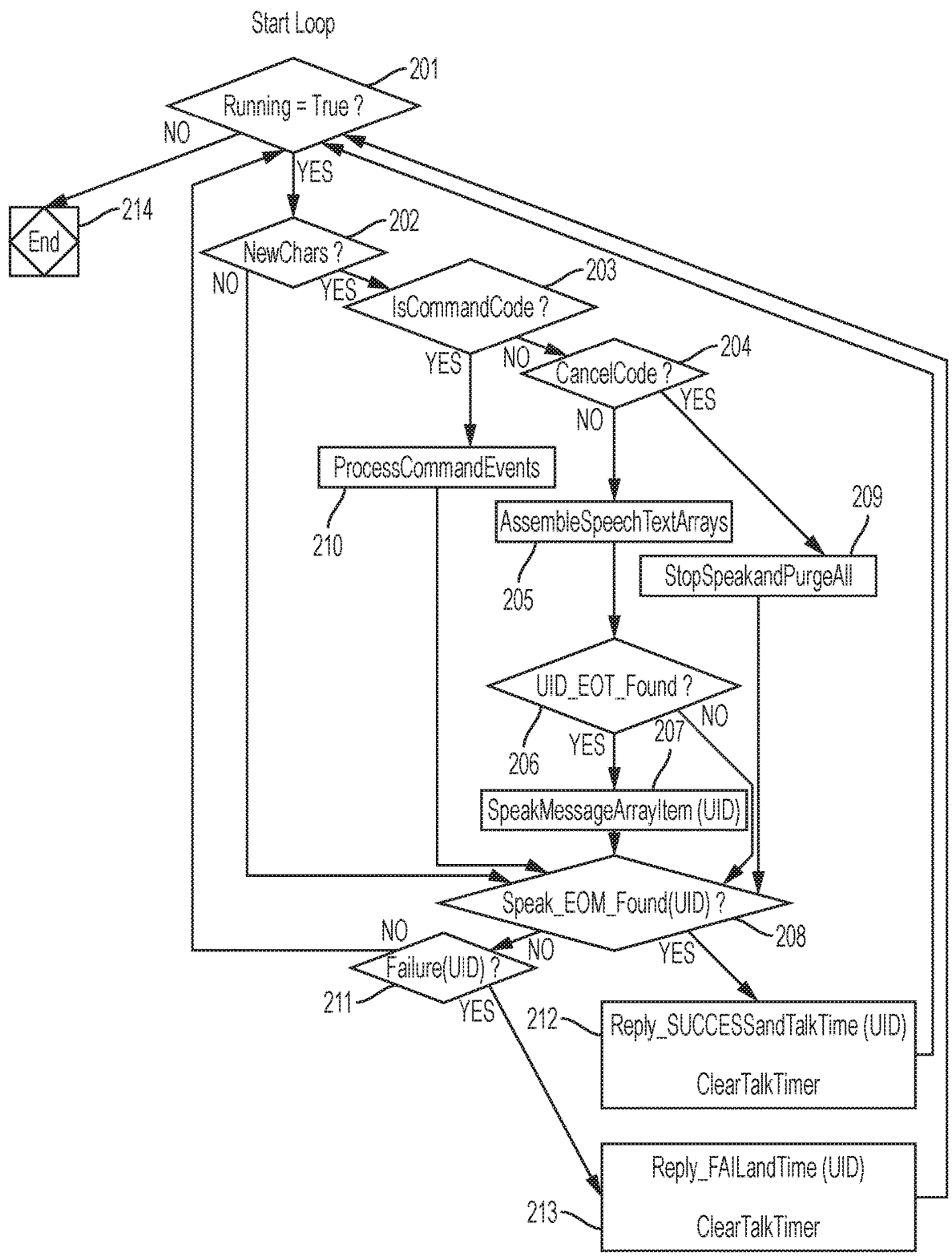
FIG. 2 shows a principal process flow of a process for operation of an embodiment of a notification terminal.
Figure 3:
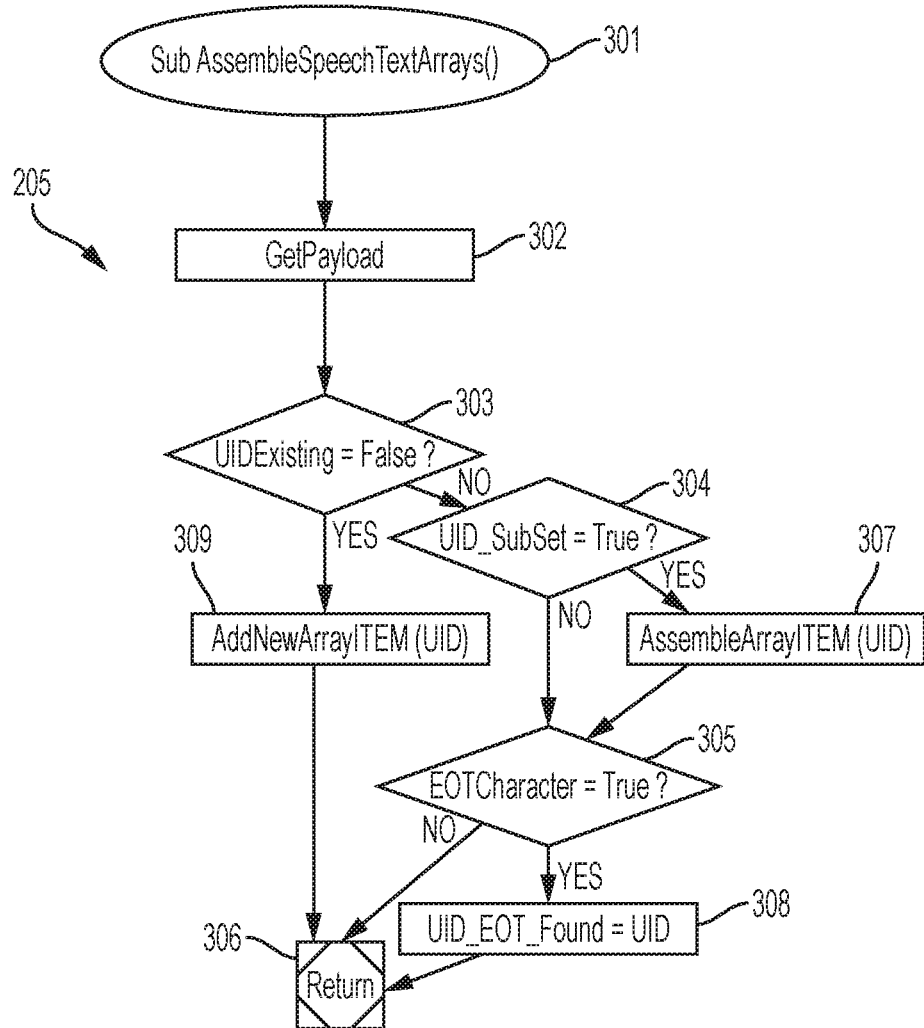
FIG. 3 shows a sub-process for assembling a speech text array.
Figure 4:
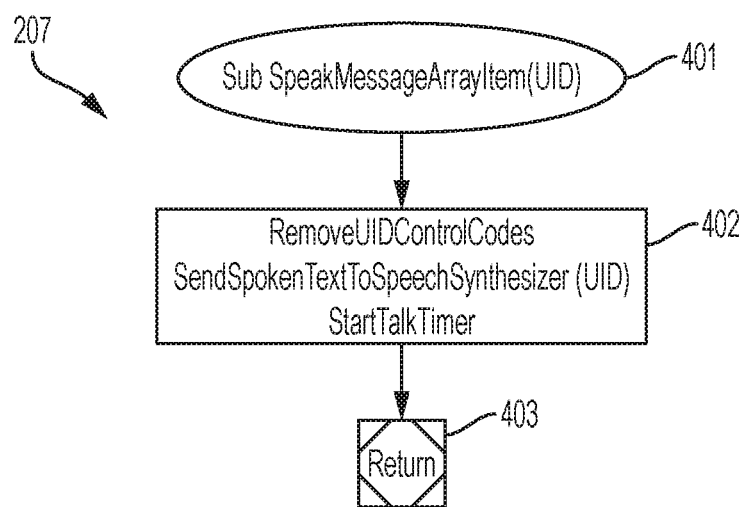
FIG. 4 shows a sub-process for synthesizing speech of a message array.

The speech synthesizer 104 may be of the type provided by the TextSpeak Design Group as shown in the Users' Guide for TTS-EM-EN-C1/C2 or based on a core processor chip, a software program incorporated in an operating system, or module such as the TextSpeak TTS-EM. An announcement is audio and/or command information in a unit designated by a user. The content of an announcement may be determined, directly or indirectly by a user, although the system may impose operational limits on this determination. An announcement may be delivered to a terminal in one or more messages. The length of a message or size of the message payload may be limited by a communication protocol. For example, the SMS protocol limits the single message payload to 160 characters, LoRa is limited to 256 byte and other LPWA systems the payload may less than 100 bytes. The number of messages required to deliver an announcement may be determined by the length of the announcements and the size limits imposed by the protocol being used, such as MMS or 3GPP TS 23.040 concatenation services for SMS. The embodiment described does not require such services, but can support them when they are present. FIGS. 2, 3, and 4 show a process for operation of an embodiment of a notification terminal. FIG. 2 shows the principal process flow. FIG. 3 shows a sub-process for assembling an announcement that includes a sequence of linguistic symbols. FIG. 4 shows a sub-process for synthesizing speech using a message array.

According to FIG. 2, the notification terminal process entry point is shown at decision 201. The process entry point decision 201 may first examine if the terminal is ready to process messages. If the terminal is not ready to process messages, the process ends at step 214. If the process is running, i.e. the system is ready to process messages, the next inquiry 202 is whether a new character is received. If a new character is received, inquiry 203 determines whether the character is a command code. In this embodiment, the set of characters may include linguistic symbols intended to be processed by a speech synthesizer, a cancel code, or a command code. A linguistic symbol is data representing an utterance and/or information about an utterance. Linguistic symbols may include representations of phonemes, letters, phonology, morphology, syntax or semantics. The useful aspect of linguistic symbols in the context of the system is that the linguistic symbols are used to synthesize speech. If the character is not a command code, step 204 determines whether the character is a cancel code. If the character is not a cancel code, the character then may be passed to the assemble_speech_text_array sub-process 205.

In view of the possibility of more than one announcement being delivered to a notification terminal, each announcement may include an announcement identification ("AID"). The announcement identification may be a unique identification or a pseudo-unique identification. The announcement identification should be assigned to an announcement according to a scheme which has a very low probability of coinciding with another announcement identification being delivered at or near the same time. Announcements may be of varying lengths. Each announcement may be delivered by one or more messages. According to some message protocols, maximum length of a message may be limited to a size that is insufficient to deliver an entire announcement. In cases with multiple messages, each message should include the announcement identification and a message identification. The message identification may indicate the sequence of the message within the announcement. A message may include an End of Message data string ("EOM") character or sequence. One message in each announcement should include a signal that it represents the last message in an announcement referred to as an End of Transmission data string ("EOT").

Upon return from the sub-process 205, inquiry 206 determines whether an EOT is present for a particular AID. If the EOT is found, processing passes to the speak_message_array_item sub-process 207. If no EOT is found and upon return from the speak_message_array_item sub-process 207, the next inquiry 208 is whether a speak_end_of_message ("EOS") is found for an AID. The speak_end_of_message_found sub-process 208 monitors delivery of an announcement. This could be accomplished by checking a sound card or Digital to Analog converter for an idle state indication according to one possible embodiment. Another possible embodiment could be a supervision embodiment where a microphone or other sensor monitors an audio output or ambient audio. The sensor output may be processed to determine whether the announcement is complete or interrupted. If decision 208 determines that an EOS indication is found for a particular AID, step 212 generates a "reply success and talk time" indication for the AID. The "reply success and talk time" may be a confirmation code and time stamp or time interval. Next, step 212 clears a timer and returns process flow to the entry point 201. If inquiry 208 determines that an EOS is not found, inquiry 211 determines if a failure has been found. If a failure code has not been found, then the process flow is returned to entry point 201. If the failure code is found, step 213 generates a failure reply and time stamp for the AID and clears the talk timer. Control may then be passed back to the entry point 201.

If inquiry 204 identified a cancel code, step 209 may control the stop_speak_and_purge_all process. The stop_speak_and_purge_all process may interrupt a speech synthesizer and clear a speech synthesizer input buffer. Control may then be processed to inquiry 208, as described above where the success or failure of the action is reported in 212 or 213.

If inquiry 203 determines that the character is a command code, the system will process the command code at 210 and then proceed to inquiry 208 and determine if an EOS is present for a particular AID. Although no Speech may be generated in in a command code, the success or failure of the action is reported in 212 or 213. FIG. 3 shows an embodiment of an assemble_speech_text_array sub-process 205 when messages may or may not require concatenation. The entry point for the sub-process is shown at 301. The next step is to acquire the message data payload at step 302 and then make an inquiry into whether the payload relates to a new announcement or is part of an announcement already in process. If a message being processed belongs to a new announcement, a new_array_item is added at step 309 and the sub-process returns to step 306. Step 304 identifies if the message is part of an existing array and if so, concatenates or inserts the message into the array associated with the AID at the position indicated by the message sequencer (or Sequence Identifier, "SID"). This embodiment is implemented with the variable name "UID" to represent an AID and then query 305 determines if it is an EOT character. If query 304 has a no result, then the next query 305 determines if the character is an EOT character. If the character is not an EOT, the sub-process returns at 306. If the character is an end of transmission character, the AID EOT found determination is set to identify the AID at step 308 and then the sub-process returns to the main process at 306. In this way, a single message or multi-part message array may be aggregated and presented as shown in 207.

FIG. 4 shows the sub-process for the speak_message_array_item (UID) 207. The sub-process 207 begins at step 401. Next, at step 402 the UID codes and message identifiers are removed and speech tokens are queued to the speech synthesizer and a start talk timer is initiated at step 402 then the sub-process returns to the main process at step 403.

Figure 5:
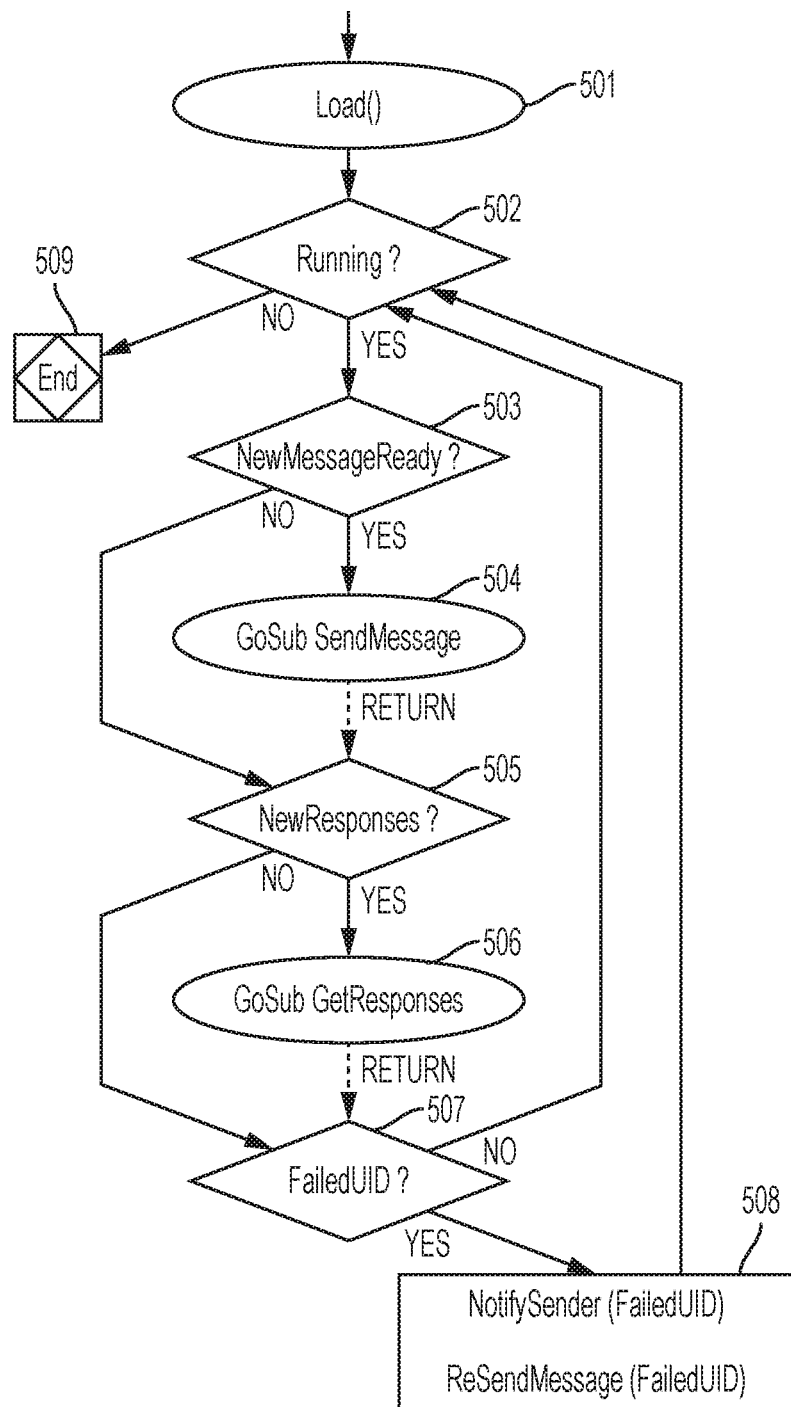
FIG. 5 shows the main server side process flow for transmitting messages to one or more notification terminals.
Figure 6:
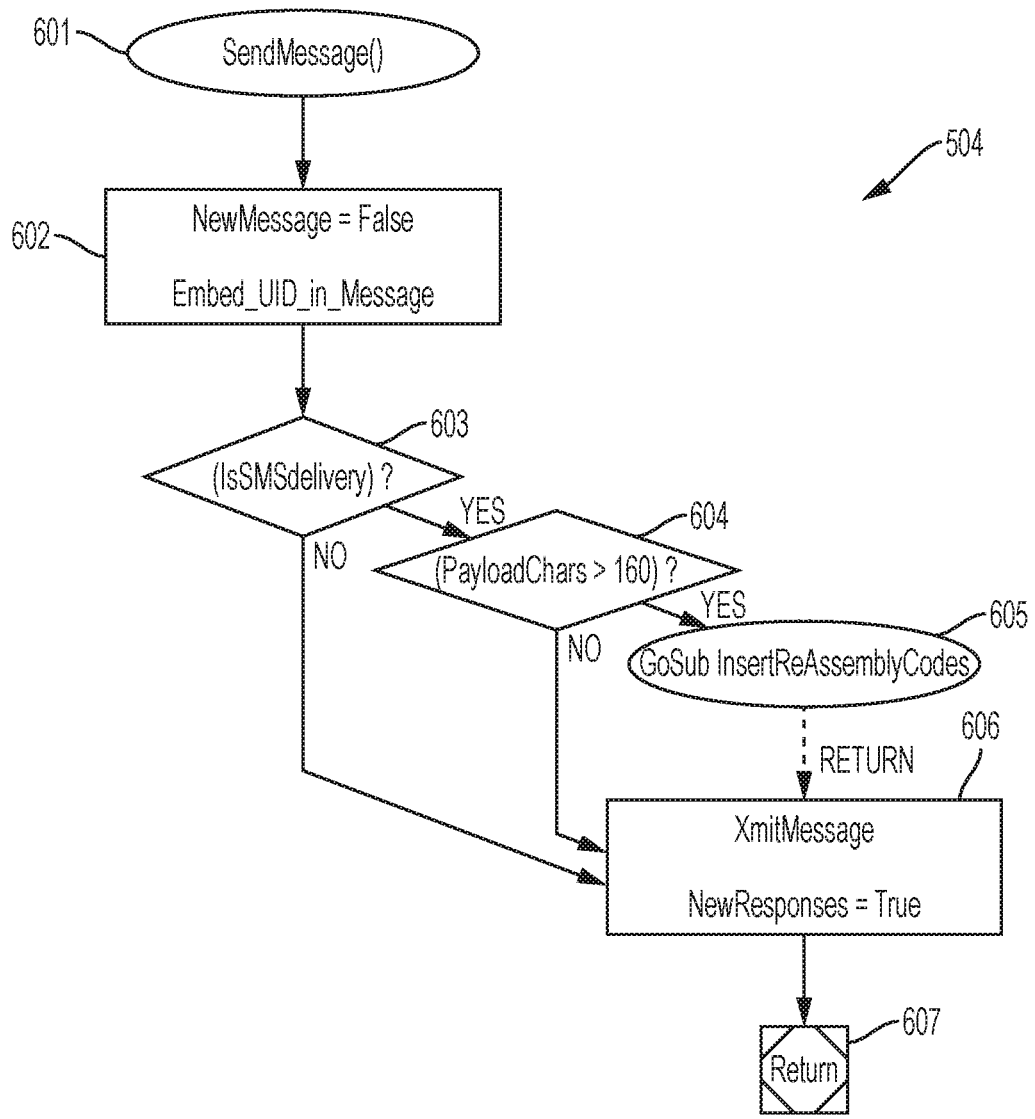
FIG. 6 shows a send message sub-process.
Figure 7:
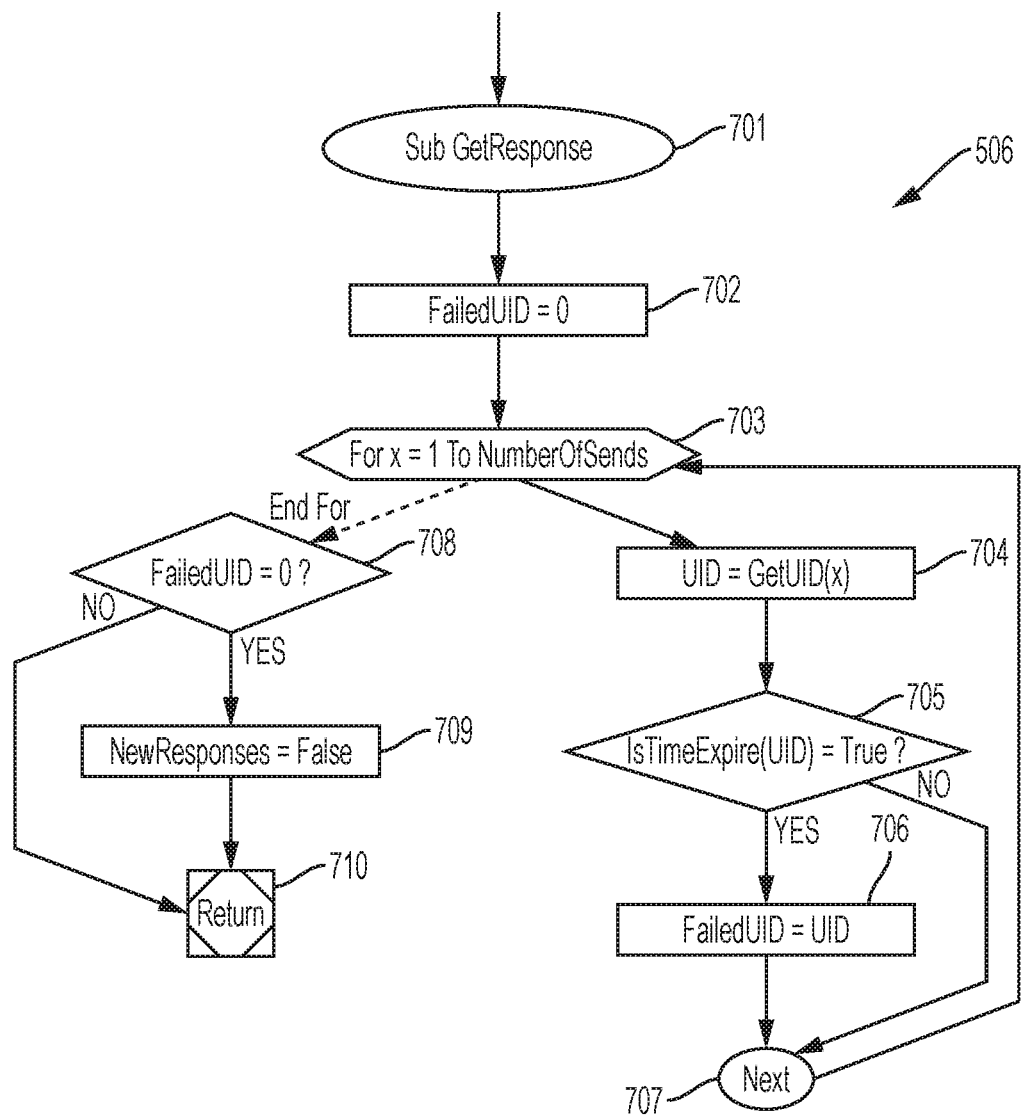
FIG. 7 shows a get responses sub-process.

FIGS. 5, 6, and 7 show a server side process for transmitting and receiving messages to/from one or more notification terminals. The server can further be used to convert messaging to/from emails, voice calls, cellular carriers, databases and alerting notifications. The server may host these subsystems or be connected to Cloud communications platforms with Voice, Video, Telephone & Messaging API services such as Nexmo or Twilio. FIG. 5 shows the main server side process flow. FIG. 6 shows a SendMessage sub-process. FIG. 7 shows a GetResponse sub-process. The server side process operates to send messages and receive confirmations. An AID code is inserted in a message. The system uses the AID to track transmission, receipt, and confirmation of announcements. The client side will send a response, for example, when an announcement is converted and output to audio. If no confirmation is received within an appropriate time, the announcement may be resent. A timer may be set for the appropriate period after which the system assumes an error occurred if no confirmation is received. A notification can be issued to a system operator or user identifying a warning or failure. The client may also send a URC (Unsolicited Response Communication) to the server that may include an event, status report or notification for action by the server software or server controlled hardware.

The server side process may be initiated at a load step 501 to initiate transmission of a new announcement. Query 502 may indicate whether the server side transmission process is running. If not, the load process may be terminated at step 509. If the server side is running, then query 503 determines whether a new message is ready. If a new message is ready, then the send_message sub-process is invoked at 504. Upon return from the send_message sub-process and if there is no new message ready, query 505 determines if any new responses have been received, either as sent message Responses or URCs. If so, the get_responses sub-process 506 is invoked. Upon return from the get_responses sub-process and if there are no new processes, query 507 determines if there is a failed AID. As stated above, this determination can be based on a time out condition. If there is a failed AID, then the sender may be notified and the message may be resent at step 508 whereupon the process is returned to query 502. If there is no failed AID, the process loops back and repeats at query 502.

FIG. 6 shows a send_message sub-process. The send_message sub-process operates to insert announcement identifications in every announcement. In this way, a single announcement may be delivered over multiple messages, each having the same AID. The AID is useful to assemble constituent messages into a single announcement, and useful to coordinate confirmation and/or failure responses. The entry point for the send_message sub-process is shown at 601. The new message indicator is set as FALSE and the process of embedding an AID in the message is accomplished at step 602. Query 603 determines whether the delivery will be through SMS or other payload limited transmission. In this example the limit is cited at 160 characters for clarity. If yes, inquiry 604 determines whether the message payload is greater than 160 characters at 604. If the payload is greater than 160 characters, a sub-process 605 may be invoked which segments the announcement into payloads of less than 160 characters and inserts the AID and some sequence indicator into each constituent message. Once sub-process 605 returns with messages all having payloads less than 160 characters, the messages are transmitted at step 606, and the new responses indicator is set to TRUE. Step 607 is an end of sub-process and return to the main process. If inquiry 603 determines that the delivery is not through SMS, the 160-character limitation is not applicable so the message may simply be transmitted at step 606. Similarly, if inquiry 604 determines an SMS delivery involves a payload of less than 160 characters, the message may be delivered without further segmentation.

FIG. 7 shows a GetResponse sub-process. The GetResponse sub-process operates to iterate all outstanding (sent) messages, waits for a confirmation for each AID or a timeout of the AID and note it as a failed send. It also allows for optional processing of URCs. When received, URC's are processed and confirmed back to the client The GetResponse sub-process 506 is initiated at entry point 701. The failed UID level is set to zero at step 707. A loop may be initiated for x=1 to number of sends at step 703. If x does not equal the number of sends, the AID may be retrieved at step 704. Query 705 determines whether UID time has expired for that AID. If so, the AID is noted as failed UID at 706, and the loop is incremented at step 707. If the time expired and AID is not true, the loop is also incremented at step 707 and returned to step 703. When step 703 determines that x equals the number of sends, the loop is terminated and query 708 determines if the failed UID level is zero. If the failed UID level is zero, then a New Response flag is set to false at step 709, to inform other processes there are no pending responses to process in successive iterations, and the sub-process returns at step 710 If the failed UID is not equal to zero, then the sub-process returns at step 710.

In a typical deployment, such as an outdoor public event, the Terminal may be attached to public address system used for audience entertainment. In the event of an emergency officials of the event may use any mobile device to send a standard SMS text message, that would contain a real-time emergency announcement instructions, as well as an embedded control code that signals the Controller (111) to invoke a relay, disconnecting current music input, to insert a voice announcement representative of the text message directly into the public paging system. The message sent may be directed to the server to be dispatched to client terminals. Alternatively, the server functionality may be contained in the mobile device thereby eliminating the need for a central server and further enhancing reliability and hardening the notification system.

In another scenario, a machine that issues malfunction notices based on data normal only shown on LCD as text, may be connected to a wireless LPWA or a cellular network to general and automatic SMS message. In the case of a railroad crossing gate malfunction, a message would create a real-time audio announcement to the train driver, and send an SMS/LPWA message from (102) to a wireless network notify the Rail Command Center of an emergency in progress. This message may be distributed for further notifications via a rail center message distribution program or directly to another Terminal at the Rail Center, for an audible announcement or to individuals (passengers or drivers) who may be at a rail crossings or stations.

In a third scenario, a public and campus safety system that replies on SMS Message distribution in commonly available "Mass Notification Software", such as "Omnilert" or "Rapid Notify" is limited to reaching mobile phones with visual messages. With the Invention, the Communications Terminal, 102 may be a Cellular Terminal and have an assigned dial-able telephone number. In this case the Mass Notification software may assign the Terminal telephone number as the primary "user" so that the SMS message received by the terminal may make an announcement in the building speakers and/or connected to campus audio paging systems. This would create a substantially beneficial warning method to just SMS message distribution as it would reach non-subscribers and be heard by a wide audience within seconds offering a warning well ahead of SMS messages including in a potential 1000-person listing.

The techniques, processes and apparatus described may be utilized to control operation of any device and conserve use of resources based on conditions detected or applicable to the device.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of generating audio announcements have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A notification terminal comprising:
   a communication terminal configured to receive announcement communications wherein said announcement communications include a message identification, a sequence identification, and one or more linguistic symbols;
   a data parser and decoder responsive to said communication terminal configured to parse and decode said announcement communications and configured to group announcement communications having the same message identifications and order announcement communications having the same message identifications according to said sequence identification and configured to provide linguistic symbols of a group of announcement communications having the same message identifications and ordered according to said sequence identification to a linguistic output of said data parser and decoder;
   a speech synthesizer connected to a said linguistic output of said data parser and decoder and having an output of signals representing audio information; and
   further comprising analytics configured to report a condition indicative of successful completion of announcement of linguistic symbols of announcement communications having the same message identification.

2. The notification terminal according to claim 1 wherein the communication terminal is an LPWA (low power wide area) network communication terminal.

3. The notification terminal according to claim 1 wherein the communication terminal is a low data rate cellular terminal with an SMS channel.

4. The notification terminal according to claim 1 wherein the communication terminal is a low data rate radio terminal with mesh network channels.

5. The notification terminal according to claim 1 further comprising an amplifier connected to said output of said signals representing audio information; and
   wherein an output of said amplifier is connected to at least one of a speaker, transducer, and connection terminal.

6. The notification terminal according to claim 1 wherein said data parser and decoder further comprises a command parser configured to identify and connect input commands to a controller.

7. The notification terminal according to claim 1 further comprises a message array connected to an output of said data parser and decoder.

8. The notification terminal according to claim 1 further comprising a communication interface connected to a communication channel, wherein said communication interface is connected to said data parser and decoder.

9. The notification terminal according to claim 1 wherein said data parser and decoder has a trigger output.

10. The notification terminal according to claim 1 wherein said analytics is configured to issue a confirmation upon detection of completion of processing by said speech synthesizer.

11. The notification terminal according to claim 1 wherein said report is a confirmation of successful announcement.

12. The notification terminal according to claim 1 wherein said analytics is connected to said communication terminal.

13. The notification terminal according to claim 1 wherein said analytics is further configured to issue a notice indicative of an event.

14. The notification terminal according to claim 1 wherein said analytics is further configured to issue a notice indicative of status.

15. The notification terminal according to claim 1 wherein said analytics is further configured to issue a notice which is a notification for action.

16. A notification terminal comprising:
- a communication terminal configured to receive announcement communications wherein said announcement communications include a message identification, and a sequence identification, and one or more linguistic symbols;
- a data parser and decoder responsive to said communication terminal configured to parse and decode said announcement communications and configured to group announcement communications having the same message identifications and order announcement communications having the same message identifications according to said sequence identification and configured to provide linguistic symbols of a group of announcement communications having the same message identifications and ordered according to said sequence identification to a linguistic output of said data parser and decoder;
- a speech synthesizer connected to a said linguistic output of said data parser and decoder and having an output of signals representing audio information; and
- further comprising analytics configured to report a condition indicative of successful completion of announcement of linguistic symbols of announcement communications having the same message identification;
- wherein said data parser and decoder further comprises a command parser configured to identify and connect input commands to a controller and wherein said controller is configured to discard messages related to an announcement identifier if a complete sequence of messages related to said announcement identifier are not received within a time period.

* * * * *